United States Patent [19]
Loney

[11] Patent Number: 5,110,195
[45] Date of Patent: May 5, 1992

[54] HIGH BANDWIDTH STEERING MIRROR

[75] Inventor: Gregory C. Loney, Lexington, Mass.

[73] Assignee: Massachusetts Institute of Technology, Cambridge, Mass.

[21] Appl. No.: 670,500

[22] Filed: Mar. 15, 1991

Related U.S. Application Data

[63] Continuation of Ser. No. 493,220, Mar. 14, 1990, abandoned.

[51] Int. Cl.⁵ .............................................. G02B 7/18
[52] U.S. Cl. ..................................... 359/224; 359/876
[58] Field of Search ................ 350/487, 486, 636, 631

[56] References Cited

U.S. PATENT DOCUMENTS

| | | | |
|---|---|---|---|
| 3,964,336 | 6/1976 | Harmening | 74/501 M |
| 3,981,566 | 9/1976 | Frank et al. | 350/285 |
| 4,073,567 | 2/1978 | Lakerveld et al. | 350/6.5 |
| 4,174,832 | 11/1979 | Umeki et al. | 350/285 |
| 4,560,925 | 12/1985 | Niven et al. | 324/97 |
| 4,664,487 | 5/1987 | Tam | 350/486 |
| 4,705,365 | 11/1987 | Wakita et al. | 350/487 |
| 4,775,815 | 10/1988 | Heinz | 310/328 |
| 4,941,740 | 7/1990 | Sigman | 350/636 |

OTHER PUBLICATIONS

B. J. Hogan, *Reactionless Beamsteering Mirror May Aim Lasers for SDI*, Design News, pp. 104-108, Sep. 8, 1986.

Primary Examiner—Bruce Y. Arnold
Assistant Examiner—Rebecca D. Gass
Attorney, Agent, or Firm—Hamilton, Brook, Smith & Reynolds

[57] ABSTRACT

A steering mirror assembly operates in a stable manner with a high bandwidth, with one to two degree peak-to-peak angular stroke. The steering mirror assembly includes a mirror for directing signals to their destination by reflection. The steering mirror may be moved through any position in a cone of several degrees. Movement of the mirror is achieved by a number of actuators. The mirror is coupled to a flexure ring that locks out undesirable directions of motion. The mirror assembly also includes position sensor that indicate to the assembly where the mirror is currently positioned. Data from these sensors is used as feedback to appropriately adjust mirror position.

17 Claims, 7 Drawing Sheets

HIGH BANDWIDTH STEERING MIRROR

The Government has right in this invention pursuant to contract Number F19628-85-C-0002 awarded by the Department of the Air Force.

This is a continuation of copending application Ser. No. 07/493,220 filed on Nov. 14, 1990 now abandoned.

BACKGROUND OF THE INVENTION

It is often desirable to direct signals propagated through free space to a target. One means for so directing signals is a steering mirror. Steering mirrors operate by reflecting the signal to their target destination. Steering mirrors may be configured to reflect signals of many different types including microwave radiation signals, light and laser radiation signals. Typically, the steering mirror assembly has some means for moving the mirror's orientation (some combination of elevation and azimuth) relative to the signals so as to alter the reflective path of the signals. The mirror assembly may be implemented with a feedback loop, where motions are sensed, electronically conditioned, and used to adjust the mirror's orientation.

SUMMARY OF THE INVENTION

An assembly for steering a mass through a range of angular orientations includes a deformable post. The deformable post serves to hold the mass captively relative to the rest of the assembly and also serves to resist the linear motion of the mass along the axis of the post. The assembly additionally includes a steering means for adjusting an angular orientation of the mass relative to a null position. The angular orientations are manipulated by a set of actuators. The motion instilled by the actuators, however, is resisted by a flexure ring. Specifically, the flexure ring resists the rotational and linear motion of the mass in a plane perpendicular to the post, as well as rotations of the mass about axis of the post. Further, the flexure ring in conjunction with the deformable post serves to act as a linear, frictionless rotational bearing stably supporting the mass. The flexure ring comprises an outer ring that provides coupling of the flexure ring to the stationary portion of the assembly and an inner ring that provides coupling of the flexure ring to the mass. In addition, a set of arms connect the inner ring to the outer ring. In accordance with a more particular embodiment of the present invention, the mass is a steering mirror.

It is preferred that the flexure ring arms are coated with a damping agent to prevent high amplitude bending resonances of the flexure ring arms. These resonances adversely affect the stable operation of the steering mirror assembly under high bandwidth feedback control. One suitable damping agent is an epoxy.

Another preferable characteristic of the assembly is that the actuators be voice-coil acuators. Such actuators may be positioned symmetrically behind the mirror in a square arrangement of four actuators. Moreover, it is preferred that the actuators have a large enough stroke to adjust the angular orientation of the mirror by approximately one to two degrees.

The assembly preferably includes a feedback loop. The feedback loop provides information concerning the position of the mirror so that adjustments to the position can be made. The feedback loop, thus, seeks to eliminate disparity between the desired position and the actual position of the mass or mirror. To facilitate such feedback, the assembly also includes motion sensors. Many different varieties of motion sensors may be used, but one preferable variety is that of eddy current sensors.

DETAILED DESCRIPTION OF THE PREFERRED EMBODIMENT

The present invention concerns a steering mirror assembly that can actively compensate a radiated beam for disturbances or jitters in the surrounding environment of the assembly. The steering mirror assembly compensates for these disturbances with a high bandwidth closed loop (i.e. approximately 10 kilohertz). The high bandwidth makes the assembly ideal for many applications where high pointing accuracies and fast two dimensional scanning is necessary. The system achieves this high bandwidth without experiencing loop instability in its response to applied torques. In particular, the assembly has only one significant resonance which can be adequately controlled with the use of conventional electronic strategies.

Those practiced in the art are familiar with the susceptibility of such steering mirror systems to instability or oscillatory behavior with ever-increasing closed loop bandwidth. This susceptibility to oscillation can be shown to occur because of complex vibrational behavior or because of the response of the mirror mass, where a number of structural or secondary resonances are coupled to the angular motion response of the mirror mass. This response creates an undue burden on the servo design, whereby the bandwidth must be limited to avoid the destabilizing resonances. The present invention overcomes these difficulties and enjoys the benefits of both high bandwidth and loop stability. The principle approach is to "tune" the mirror assembly frequency response by stiffening those degrees-of-freedom other than the tilt of the mirror mass. The tilt motion of the mirror assembly is discussed in more detail below.

Figure 1:
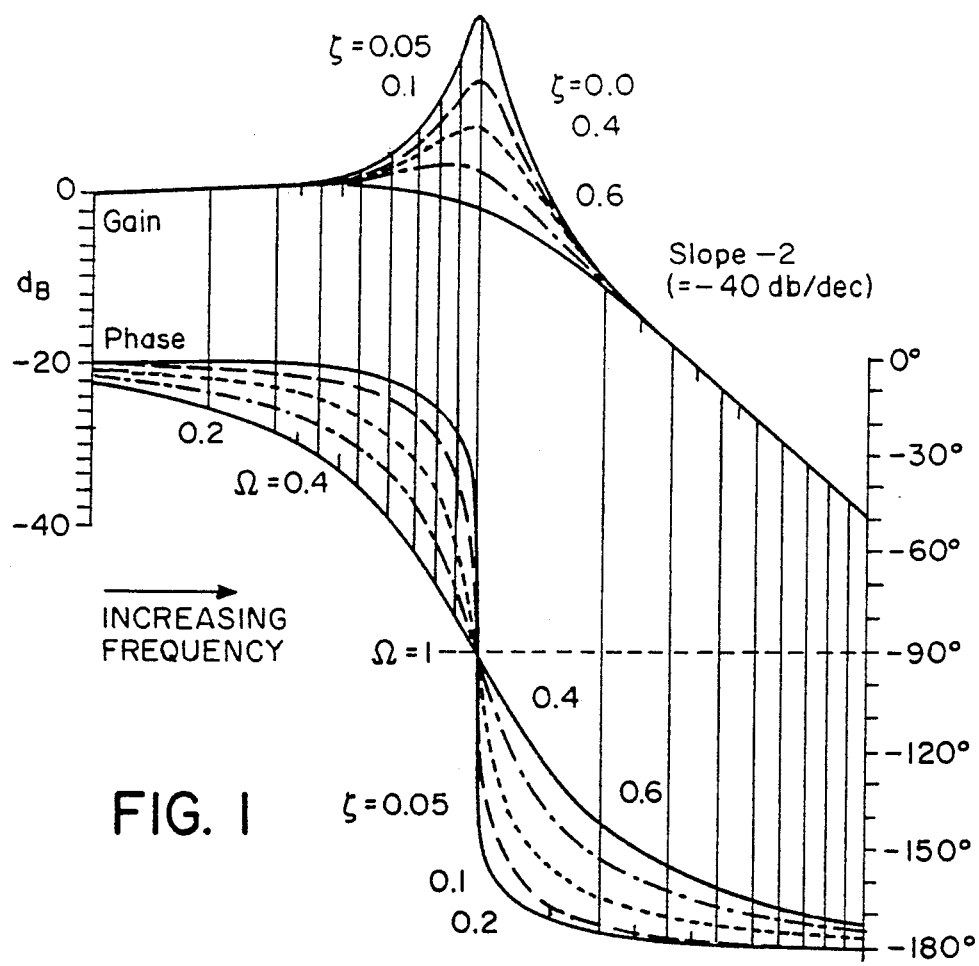
FIG. 1 depicts a set of second order frequency response curves.

The present invention achieves a response similar to the classic second order frequency response depicted in FIG. 1. This response allows a stable feedback loop to be closed around the steering mirror assembly. The curves in FIG. 1 show the frequency response of single degree of freedom oscillator with viscous damping, subjected to harmonic inputs at varying input frequencies. The response of the oscillator to these inputs is also harmonic, however, the amplitude and phase angle as compared to the input function change, depending upon the damping factor and input frequency. The amplitude response is on the upper plot and the phase response is on the lower plot in FIG. 1. Study of this plot is helpful in qualitatively understanding where servo instabilities may arise. The amplitude plot or upper graph indicates that the output amplitude matches the input amplitude in a roughly one to one manner. As frequency increases, however, the output amplitude becomes larger until a maximum value is reached. The upper plots in FIG. 1 also show the effect of varying the viscous damping factors. Specifically, with increasing damping, the amplitude at the resonant frequency diminishes. As frequency increases further, the amplitude drops to a smaller and smaller fraction of the input amplitude. In the context of the mirror assembly, this plot represents the amplitude of the mirror angular displacement in a system, where an acutating means seeks to move the mirror at a given frequency and amplitude. In the art, these amplitude and phase relationships are also referred to as Bode plots.

Implicitly the second order frequency response contains no additional modes on this descending portion of the curve at higher frequencies. In reality, this classic second-order response is possibly only in a restricted frequency band. The system designers task is to attempt to push these secondary modes up the frequency scale, or to try to reduce the coupling of the modes to the angular motion response. The particular arrangement of the flexure ring and deformable post accomplishes both these objectives. In prior art, these vibrational modes were avoided by limiting the servo bandwidth so as not to include these modes. This approach suffered the drawback of reduced system performance. In practice it is difficult to remove these modes by conventional control strategies.

Also shown in FIG. 1 is the phase change on the lower plot that results with different frequencies and different damping factors. FIG. 1 makes clear that a phase shift of 180° occurs in the vicinity of the resonant frequency. In the context of the mirror assembly, this lower curve represents the phase with respect to the input function, of the mirror angular displacement in a system where an actuating means moves the mirror at a given frequency resulting in an in-phase or out of phase output response. These lower plots are useful in assessing the stability of the steering mirror during operation. In practice the system designer is interested in a frequency called the crossover point which is the point where the amplitude plot equals one and the phase equals −180 degrees. By applying a gain or phase lead electronically, the system can be made stable. The rule of thumb is at an amplitude, heretofor called magnitude response, equal to one, the phase must be greater than −180 degrees and the magnitude must be much less than one when phase equals −180 degrees. Heuristically, this can be understood by noting that these motions are typically fedback to a summing juction where the actual mirror position is subtracted from the reference or commanded position to produce an error signal. This error signal serves to correct the errant mirror position. At mirror motion greater or equal to one and phase equal to −180 degree, this mirror position is no longer subtracted from the reference signal, but is instead added, creating an exponential divergence from the commanded position which results in system instability and oscillation. The previously mentioned secondary resonances serve to violate the rule of thumb by providing the large amplitude contributions to the mirror response while the phase is at −180 degrees. It is, thus, very desirable to have a beam steering mechanism with the previously discussed second order response.

In order to understand how the present system achieves the desirable second order response, it is useful to first examine a model that predicts with reasonable accuracy the assembly response. This model is depicted schematically in FIG. 2. The model is comprised of a rigid body 10 that represents the mirror mass. This rigid body 10 is coupled to spring elements 12, 14 and 16. These spring elements 12, 14 and 16 hold the rigid body 10 in static equilibrium. The spring 12 resists rotational motion of the rigid body. Spring 16 holds the rigid body 10 and resists motion of the body 10 in the upwards and downwards direction. Lastly, the spring 14 resists motion in the lateral direction. Each of these springs have an associated spring constant. The spring constant for spring 12 is denoted as $k_r$, the spring constant for spring 14 is denoted as $k_l$, and the spring constant for spring 16 is denoted as $k_v$. The multicolored circle 17 in the middle of the rigid body 10 connotes the center of mass of the rigid body 10.

For purposes of this model, it is assumed that all motion is planar, and it is also assumed that the vertical spring 16 can be decoupled from the rocking and lateral motions. Given these assumptions, the model may be utilized to determine the expected response of the rigid body 10 to different frequencies. In particular, the model may be utilized to pinpoint where the secondary modes are expected to arise in the response curve by calculating planar motion eigenvalues. In addition, the model indicates the coupling strength of the secondary modes, by calculating the planar motion eigenvectors. This information was used in the design of the present invention to keep the secondary modes well away from the crossover point so as to ensure stability.

Figure 2:
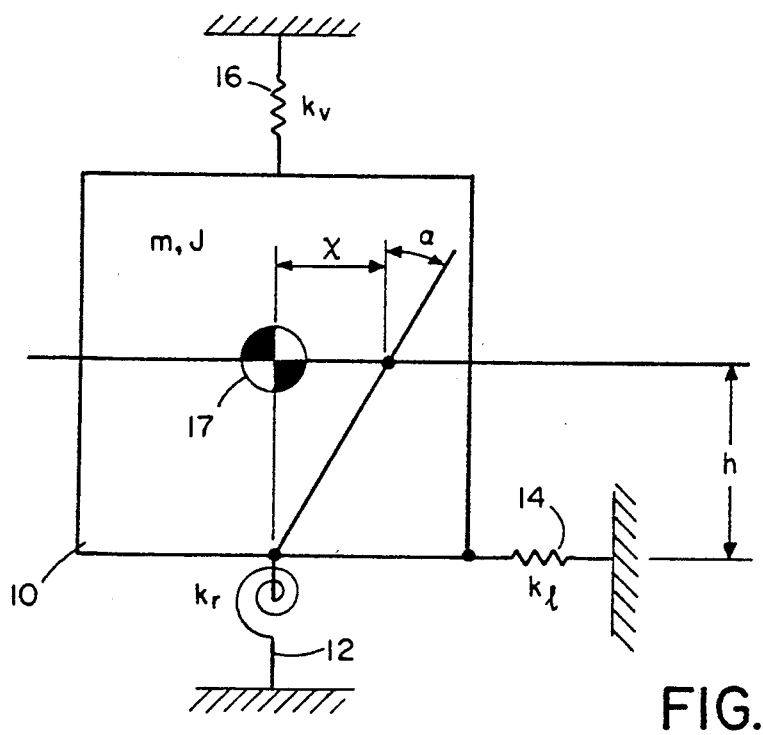
FIG. 2 shows a model of the steering mirror assembly that is useful in pinpointing secondary modes.

For the depicted model in FIG. 2, the uncoupled eigen values denoted as $\omega_r^2$ and $\omega_l^2$ have values of $$(\omega_r)^2 = k_r/J \quad (\omega_l)^2 = (k_l)/m$$

where $k_r$ and $k_l$ are spring constants for the respective springs, and J and m are as denoted in FIG. 2. In particular, J is the mass moment of interia referenced to the center of mass location, and m is simply the mass of the body. The mass moment of inertia J′, referenced to the base can be expressed as $$J' = J + mh^2$$

where m and J are as above, and h is the offset from the center of mass to the lateral spring ground point. From the uncoupled eigenvalues $\omega_r$ and $\omega_l$ and the mass moment of inertia J′ and J, the eigenvalues are found to be:

$$(\omega_1/\omega_r)^2 = \tfrac{1}{2}[(\gamma\beta + 1) - \sqrt{(\gamma\beta + 1)^2 - 4\beta}]$$

$$(\omega_2/\omega_1)^2 = \tfrac{1}{2}\beta[(\gamma\beta + 1) + \sqrt{(\gamma\beta + 1)^2 - 4\beta}]$$

and the eigenvectors are given as:

$$(\alpha h/x)_1 = 1 - (\tfrac{1}{2}\beta)((\gamma\beta + 1) - \sqrt{(\gamma\beta + 1)^2 - 4\beta})$$

$$(\alpha h/x)_2 = 1 - (\tfrac{1}{2}\beta)((\gamma\beta + 1) + \sqrt{(\gamma\beta + 1)^2 - 4\beta})$$

where $$\gamma = J_l/J$$

and $$\beta = (\omega_l/\omega_r)^2$$

Figure 3:
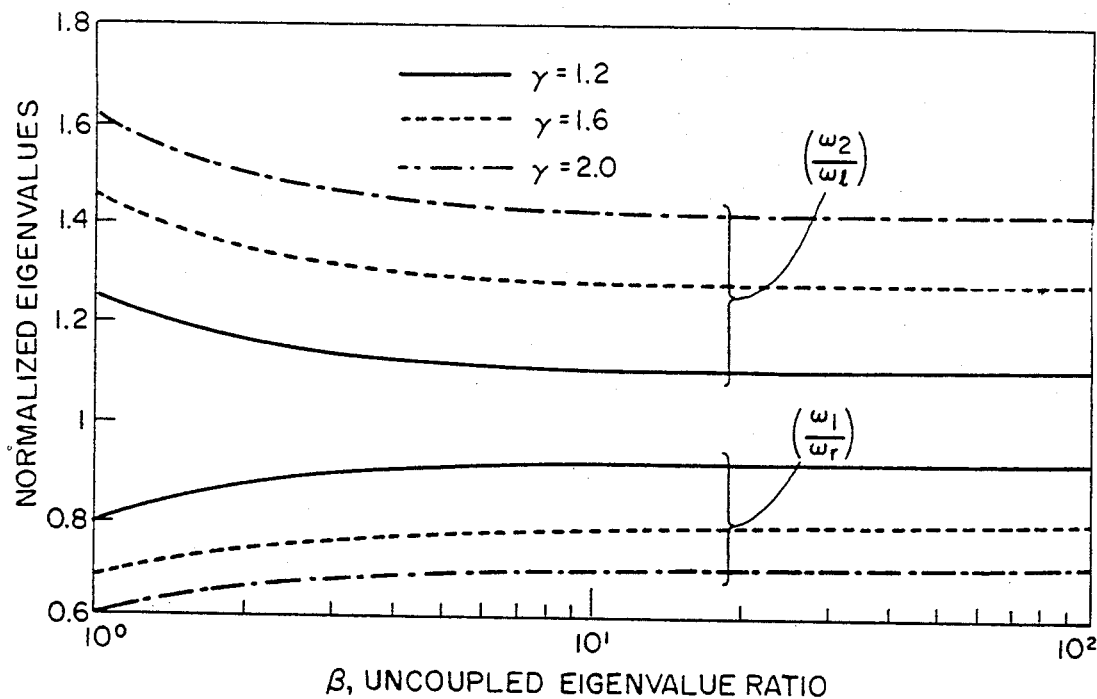
FIG. 3 is a plot of normalized eigenvalues versus an uncoupled eigenvalue ratio.
Figure 4:
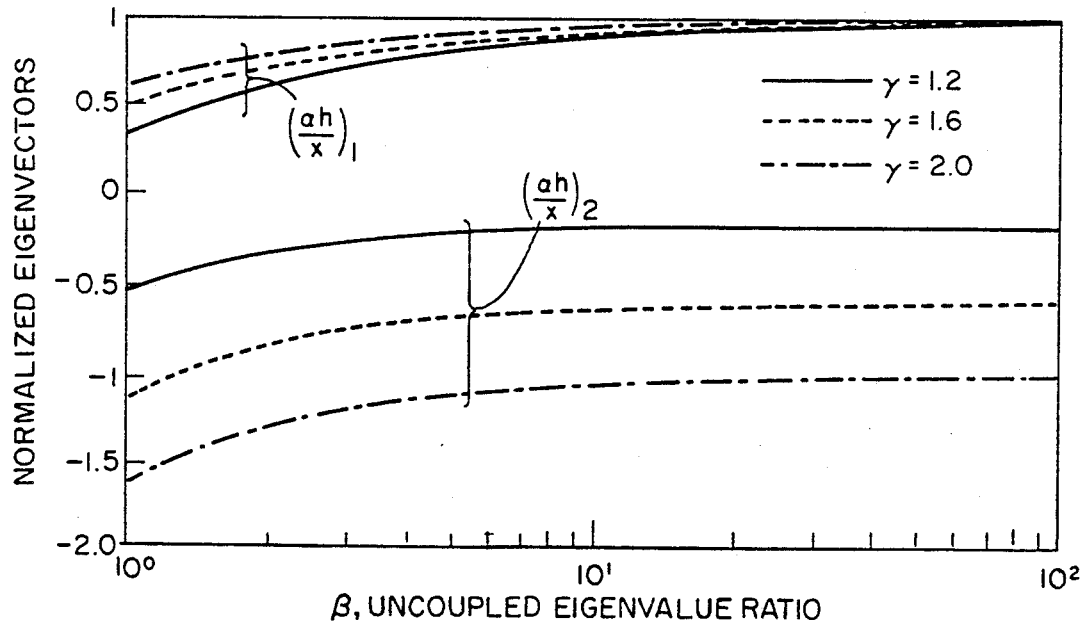
FIG. 4 is a plot of normalized eigenvectors versus an uncoupled eigenvalue ratio.

These eigenvalues give the location in the frequency domain of two vibrational modes. These vibrational modes share lateral and rocking motions. The eigenvectors provide a ratio of the rocking to lateral motion to give a measure of the coupling between the two modes. FIG. 3 depicts the effect on eigenvalues of varying $\beta$ and $\gamma$, respectively. FIG. 4 plots the effect on the eigenvectors of varying $\beta$ and $\gamma$, respectively. From these two figures it is clear that as $\gamma$ approaches 1, the second eigenvector approaches zero. It is also clear that as $\beta$ gets large, the second eigenvector approaches zero. These graphs suggest making the mirror mass as small as possible; making h, the offset from the center-of-mass to the lateral spring ground point; and maximizing the stiffness ratio between the lateral spring constant, $k_l$ and the rotational spring constant, $k_r$. Maximizing this stiffness ratio, in effect "locks" out that unactuated degree-of-freedom. Similarly, other mirror mass degrees-of-freedom of motion must by "locked" out such as the motions along the axis of the deformable post, rotations about the axis of the deformable post (torsion), as well as the lateral motions in plane perpendicular to the post. The particular flexure ring arm arrangement, which is in plane; and the separate post design provide an arrangement consistent with the objects of locking out other degrees-of-freedom motion. This arrangement allows the one to two degree peak-to-peak strokes but does not couple in the aforementioned secondary modes, due to the mirror mass on its flexible support.

Figure 5:
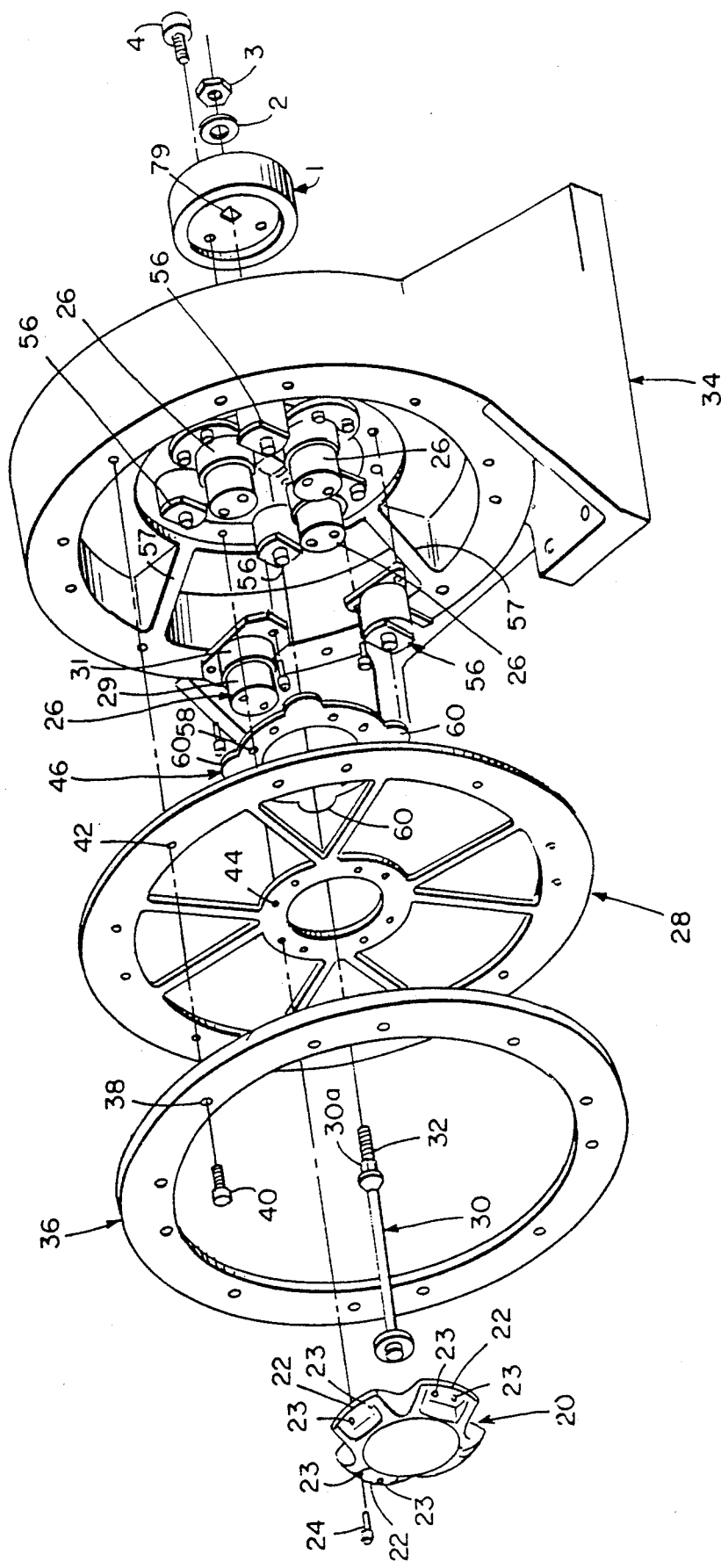
FIG. 5 illustrates the steering mirror assembly in exploded form.
Figure 6:
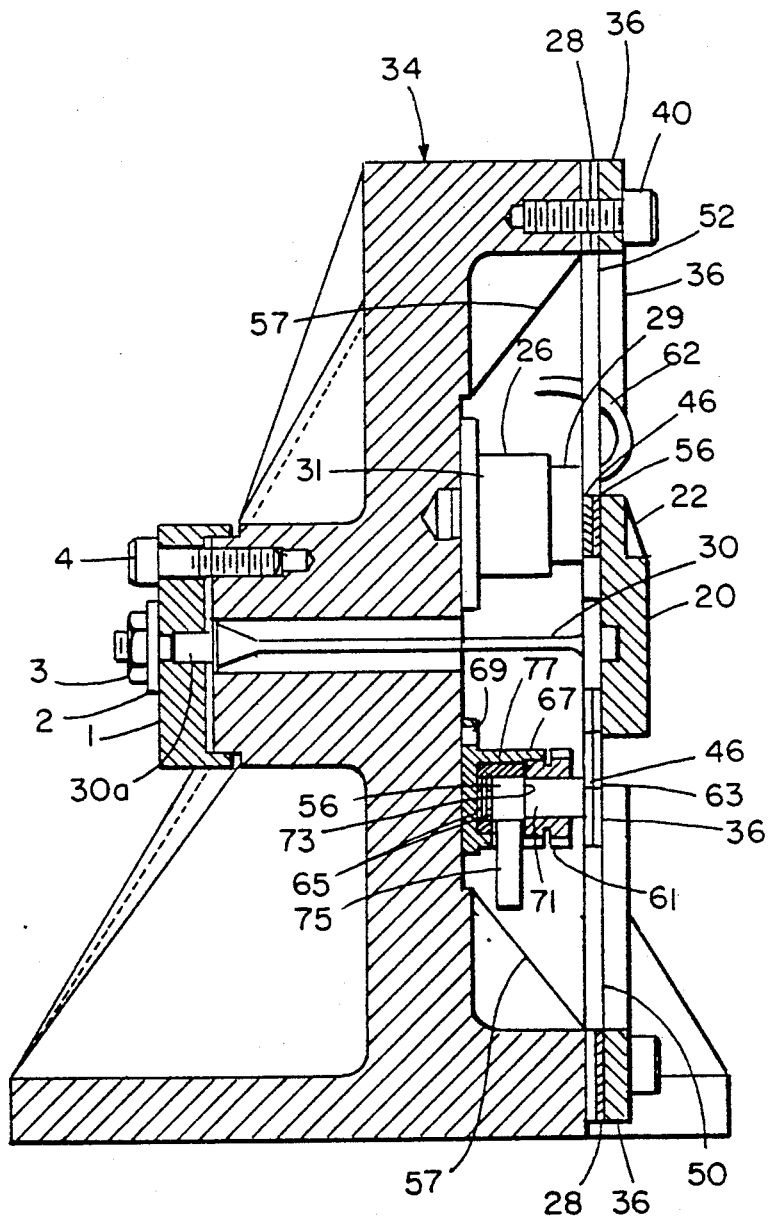
FIG. 6 shows a cross-sectional view of the steering mirror assembly take along axis VI shown in FIG. 8.

In light of the above analysis, the steering mirror assembly of the present invention has been designed so as to minimize the potential for additional modes. FIG. 5 shows the major components of the steering mirror assembly in exploded form. The assembly is also depicted in FIG. 6 which shows a cross-sectional view taken along the dotted path VI—VI shown in FIG. 8 (which is described below). The central component of the assembly is the mirror 20. The mirror 20 is designed so that it can tilt in two directions, in other words, it is driven on two separate axes. Four nodes or projections 22 are provided on the mirror. These projections 22 serve as mechanical coupling interfaces. Two holes 23 are provided in each projection 22. Screws such as 24 pass through the holes 23 to secure the mirror 20 to the rest of the assembly.

The mirror 20 is fabricated as a single piece of beryllium. It has an aluminum/silicon monoxide (Al/SiO) surface coating that forms the reflective surface. This reflective surface has a reflectance of approximately 95% and a clear aperture of approximately 16 millimeters. The mirror may, alternatively, be a glass mirror having a reflective coating that is applied using a sputtering technique or the like. Such a glass mirror may be placed on a raised boss inside a counter-bore. The mirror is lightweight to obtain a higher stiffness to weight ratio. The mirror 20 is steered by transmitting the push-pull linear forces exerted by actuators 26 (which will be described in more detail below).

A set of four actuators 26 are positioned underneath the projections 22 of the mirror 20. These actuators 26 push and pull the mirror 20 to tilt it appropriately. As can be seen in FIG. 5, the four actuators 26 are coupled to the mirror 20 via the screws such as 24 that pass through holes 23 in the four projections 22. Motion of the actuators 26 results in corresponding angular motion in the mirror 20. Four actuators as opposed to three actuators are used to import greater torque and also to minimize wavefront distortion of the reflected radiation while the mirror is being steered. Voice-coil actuators were chosen rather than piezoelectric actuators because the voice-coil actuators provide a very high bandwidth of operation and a large stroke. The stroke is on the order of one to two degrees of tilt. Unfortunately, these actuators 26 do not exert a very large force. As such, the assembly is designed to be soft in the direction which the mirror is tilted by the actuators. On the other hand, the assembly must still maintain sufficient rigidity to insure that a quick response is attainable to provide the large bandwidth. This type of system is achieved in part through a unique flexure ring 28. The flexure ring 28 will be described in more detail below.

The four electromagnetic voice-coil actuators 26 operate in pairs each actuator 26 consists of two parts, a coil bobbin 29 and a permanent magnet core assembly 31. The bobbin 29 moves in an air gap through a permanent magnetic field when current flows through the coil. The current amplitude determines the magnitude of the force and the polarity of the current determines the actuation (i.e. push or pull). A rare earth magnet (SmCo) is used as the permanent magnet to provide a high flux density in the air gap. When no current is flowing through the actuators 26, the flexure ring 28 and deformable post 30 serve to return the mirror 20 to a static equilibrium null position.

Mirror position is sensed by a set of four sensors 56. These sensors 56, like their actuator counterparts 26, are positioned symmetrically behind the mirror 20 and operate in pairs like the actuators 26. These sensors 56 are conventional eddy current sensors like those known in the prior art. Each sensor 56 utilizes a small coil to emit a fluctuating magnetic field that generates eddy currents in a conducting medium. The strength of the eddy currents is then used to measure position. The eddy current sensors have a 15 milliinch gap at a null static equilibrium position. The 1° range of the mirror adds and substracts to the 15 milliinch gap 7 milliinches. The primary benefits of using the eddy current sensor are a high bandwidth, good sensitivity, small volume and a non-contacting configuration.

Each position sensor 56 is housed in an adjustable mount assembly consisting of several components. The position sensor 56 is made up of a coil 71 embedded in a Vespel cylindrical base with a shoulder 73. This coil must be accuratley positioned relative to a target plate 46 at time of assembly to reproduce the factory calibrated null gap of 15 mils. For this reason an adjustment feature is implemented by the use of a screw cap 61 contacting the sensor base shoulder 73. The screw cap 61 is preferably made from Vespel to form a hard low friction surface to contact the sensor base shoulder and not to conduct eddy-currents of it's own which would degrade the sensor measurement sensitivity. Underneath the sensor base, is a stack of belleville washer-type springs 65 to provide a positive pre-load on the screw cap 61. The screw cap 61 has two flats 61a and 61b which may be contacted by an open end wrench to rotate the cap, thus, achieving minute height adjustment. A sleeve 77 is positioned in a encompassing housing 67 to center the sensor 56 and belleville washer-springs 65. The housing 67 is rigid and attaches to the steering mirror's housing 34. Provision is made in the housing 67 to exit an electrical lead 75 connected to the sensor 56 to provide the oscillating currents. The whole assembly is dimensionally stable, critical in this application.

The operation of the sensors 56 requires a target plate 46. The target plate furnishes the conducting medium for the eddy currents. The target plate 46 has a number of holes 58 to secure the plate 46 to the flexure ring 28 and the mirror 20. It also has a series of projections 60 that are positioned over the respective sensors 56.

Positioned behind the mirror 20 is a vertical mounting post 30. This post is an elongated flexure and is comprised of a long, low section modulus reed. This post 30 is machined out of an aluminum alloy 7075-T6. This alloy has high fatigue strength and a low elastic modulus. This post 30 serves the role served by the vertical spring 16 (FIG. 2) in the model. It enables the mirror to exhibit only moderate linear motion in the direction of the axis of the post that extends along the length of the post. The post 30, thus, limits one degree of freedom of motion, known in the art as a piston mode. Moreover, the post serves to support the mirror 20 in its static equilibrium position. This post 30 resists compression but is bendable when sufficient force is applied to it. The end of the post 32 is threaded so that it may be clamped to the securing plate 1. The square portion 30a of the threaded end passes through a square hole 79 in the securing plate 1. The threaded end is secured by a washer 2 and nut 3 that hold the post 30 secure relative to the plate 1. The square portion 30a of the threaded end prevents rotation and, in turn, prevents initial stressing of the post 30 while affixing it to plate 1 with the washer 2 and nut 3. In addition, another set of screws 4 is provided to affix the securing plate 1 to the rest of the housing 34. Plate 1 contains a locating feature which in turn references the post 30 accurately to the housing 34.

An outer housing ring 36 is provided to clamp the flexure ring 28 to the housing 34. The outer housing ring 36 has a number of holes 38 for screws such as 40 to pass. The flexure ring 28, likewise, has a plurality of holes 42 that match with the holes 38 in the outer housing ring. The screws such as 40 pass through the matching holes 38 and 42 to secure the flexure ring 28 between the outer housing ring 36 and the housing 34. In addition the flexure ring, outer ring 54, has a provision to accept close fitting pins pressed in the housing 34. The provision is a hole 42a and slot 42b which locate the flexure ring accurately to a housing reference. In this way, on assembly the flexure ring and post are kept as strain-free as possible. The flexure ring 28, in addition, contains a set of holes 44 that correspond with the holes 22 in the mirror so that screws 24 may pass to further secure the flexure ring 28 to the mirror 20.

Figure 7:
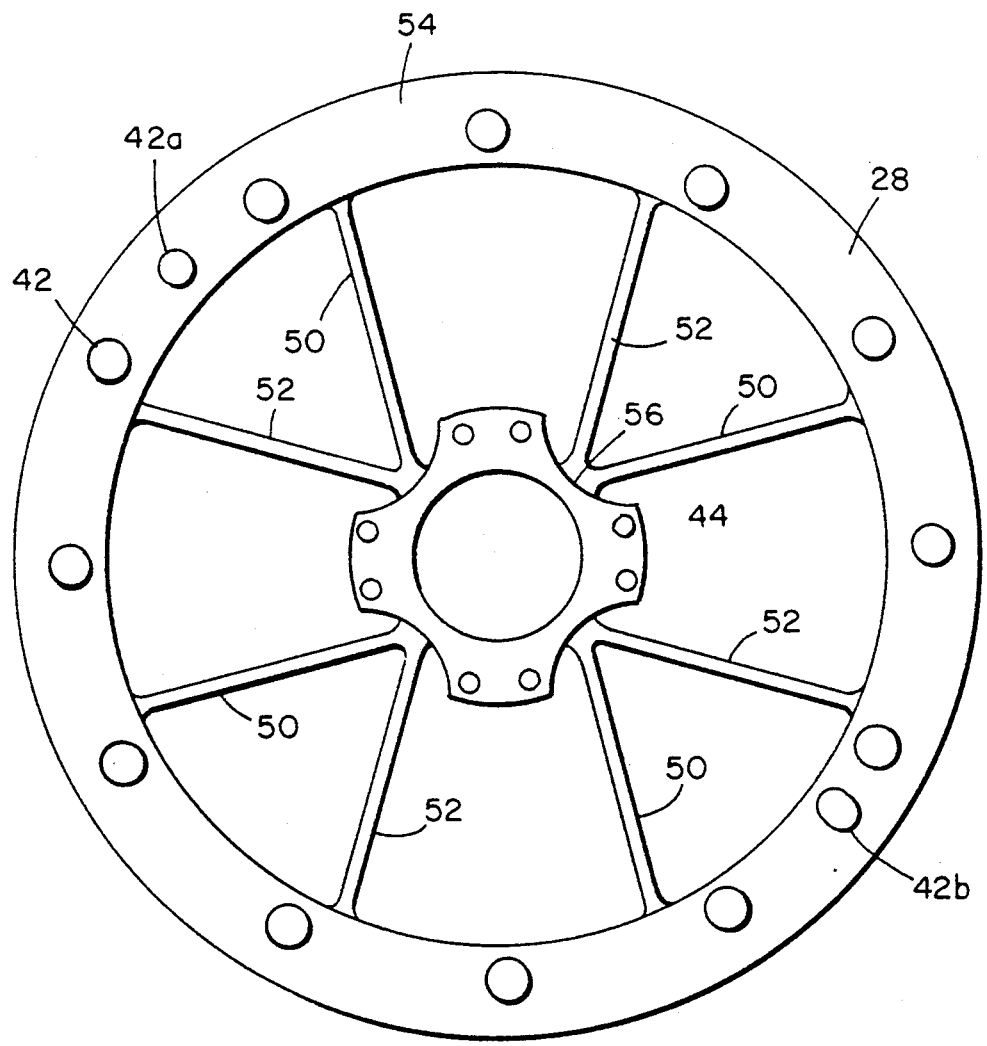
FIG. 7 shows a front view of the flexure ring.

FIG. 7 depicts the flexure ring 28. The flexure ring 28 is made of a stainless steel alloy 17-4 PH. This material provides good dimensional stability, high fatigue strength and uniformity. The flexure 28 is formed utilizing an electric discharge machine and is formed as a single piece.

The flexure ring 28 is comprised of an inner ring 56 and an outer ring 54. Connecting the inner ring 56 and outer ring 54 are a series of pairs of connecting arms 50 and 52. The pairs 50 and 52 are organized in a triangular arrangement. This arrangement allows the flexure ring to easily move in the directions of actuator movement while still resisting other directions of motion. Hence, the system is soft in the directions of tilt while still maintaining rigidity with respect to other motions that are not desirable. The flexure ring 28, thus, helps to limit additional degrees of freedom of motion that would otherwise be available to the mirror. In particular, the flexure ring 28 resists twisting rotational motion and lateral shift motion.

Figure 8:
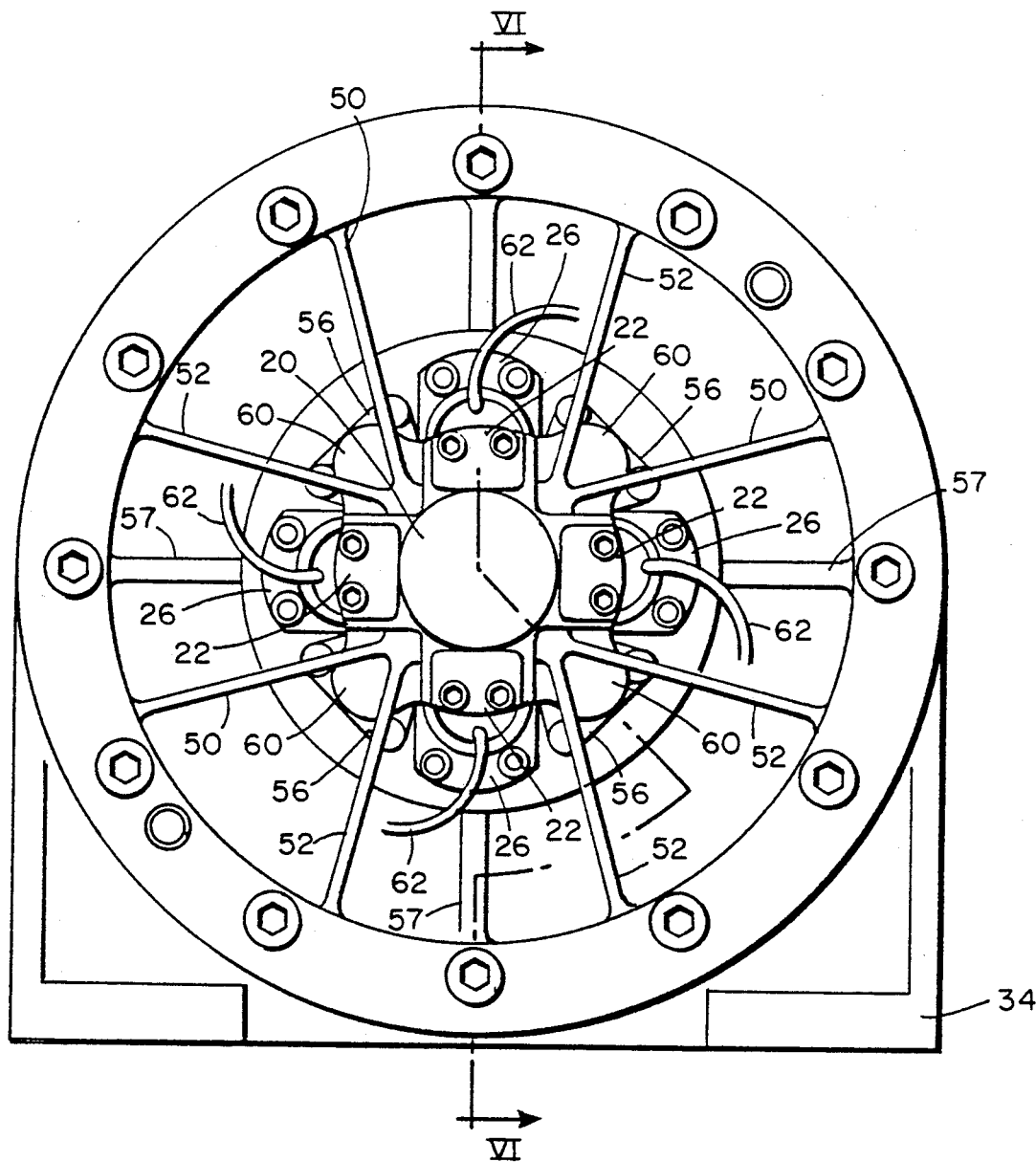
FIG. 8 depicts a front view of the steering mirror assembly.

The slender arms 50 and 52 of the flexure ring 28 are susceptible to certain resonances. To dampen out these resonances, a damping material having a thickness of approximately 10 mils is applied to the arms 50 and 52 which have a thickness of approximately 12 milliinches. The damping material is a viscoelastic material (3M2216 gray). It was applied to one side of the arms in order to dampen the bending modes. Tests have confirmed that the contribution of these bending modes to the beams steerer's frequency response, after application of the damping layer, is minimal and manageable. FIG. 8 depicts all of these components shown from a front view. As can be seen, the mirror 20 rests on top of the flexure ring 28 which, in turn, is followed by the target plate 46. Underneath the target plate projections 60 are the sensors 56, and underneath the mirror projection 22 are the actuators 56. Wires 62 run to each of the actuators to provide appropriate power.

Figure 9:
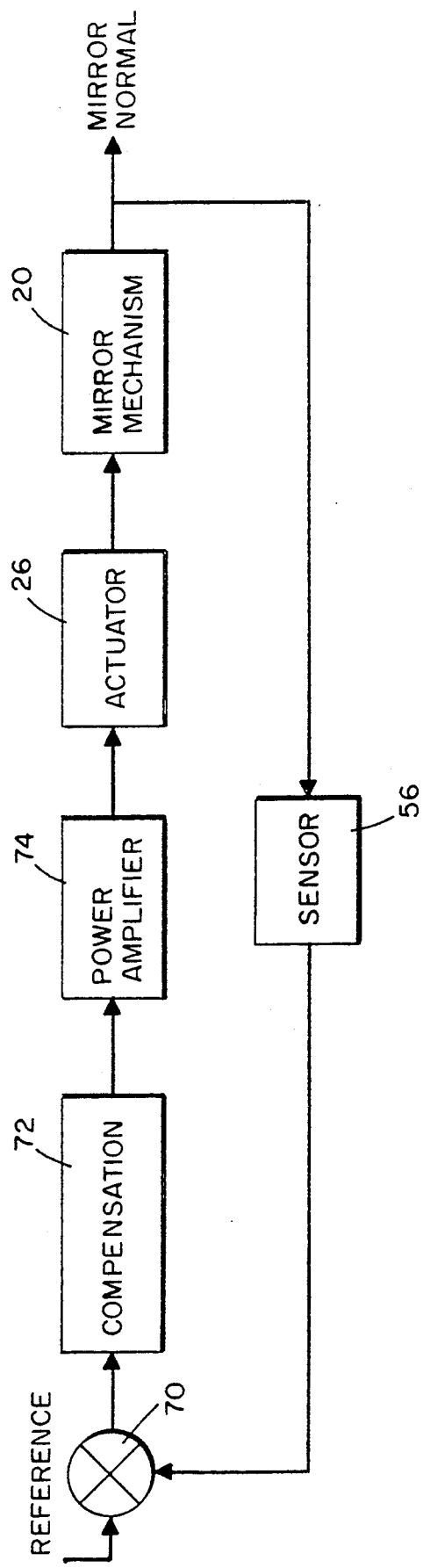
FIG. 9 is a schematic diagram of the feedback system.

Its desirable to have feedback in order to optimize performance of the steering mirror system. The feedback mechanism employed in the present invention is depicted in FIG. 9. In particular, the system includes the sensors 56 that provide position information about the mirror. This position data is fedback for comparison with a reference 70 position (which corresponds to the desired position of the mirror). In an alternative arrangement an external sensor, such as a silicon quad cell detector may be used to monitor or sense position of a beam reflected off the steering mirror. In this case, the steering mirror 20 may be commanded to keep the beam at the external sensor null, thus, compensating for beam jitter.

In both cases the sensor position information, either from an external sensor (tracking) or the onboard position sensors 56 (acquisition), is fedback to a summing junction, compared to the reference 70 or commanded signal producing an error signal. This signal can then be compensated by a lead/lag network as known in control system methodologies to boost phase at the cross-over point or some other compensation may be implemented (i.e. low frequency integrations) 72. Gain is then applied to produce the desired bandwidth and steady-state response. The voltage signals are then converted to current in the power or current amplifier 74. After conversion to current, the signals are put to the actuators 26 which impart motion to the mirror mechanism (box 20). The actuation causes adjustment of the mirror mechanism 20. Once adjustment has been completed, the actual movement of the mirror is again sensed by the sensors 56 and fed back to the reference 70. This mechanism provides a means for appropriately adjusting the mirror 20 to compensate for vibrational noise and other distortion. In particular, the feedback loop determines whether the signal is appropriately steered to the target and then adjusting the signal accordingly if it does not hit the target.

While the invention has been particularly shown and described with reference to preferred embodiments thereof, it will be understood by those skilled in the art that various changes in form and details may be made without departing from the spirit and scope of the invention as defined in appended claims.

I claim:

1. A steering mirror assembly, comprising:
   a) a base;
   b) a mirror for directing signals that strike the mirror;
   c) a deformable support post, having an axis that extends along an entire length of the post, to support and hold the mirror captively to the base and to limit linear motion of the mirror along the axis of the post, said post being positioned behind the mirror;
   d) a set of actuators on the base positioned behind the mirror to adjust an angular orientation of the mirror; and
   e) a flexure ring for limiting rotational and linear motion of the mirror and for minimizing the coupling of secondary resonances in motion of the assembly, comprising:
      an outer ring to provide coupling of the flexure ring to the base;
      an inner ring for coupling the flexure ring to the mirror; and
      a set of arms of thin material that connect the inner ring to the outer ring.

2. A steering mirror assembly as recited in claim 1 wherein the flexure ring is coated with a damping agent to prevent high amplitude bending resonances in the arms of the flexure ring.

3. A steering mirror assembly as recited in claim 2, wherein the damping agent is an epoxy.

4. A steering mirror assembly as recited in claim 1 wherein the actuators are voice-coil actuators.

5. A steering mirror assembly as recited in claim 1 wherein the set of actuators comprises four actuators positioned symmetrically behind the mirror.

6. A steering mirror assembly as recited in claim 1 wherein the peak stroke of the actuators adjusts the angular orientation of the mirror by approximately 1 to 2 degrees.

7. A steering mirror assembly as recited in claim 1, further comprising a feedback loop for providing information concerning position of the mirror so that adjustments to the position can be made.

8. A steering mirror assembly as recited in claim 7, further comprising motion sensors to provide the feedback.

9. A steering mirror assembly as recited in claim 8, wherein the motion sensors comprise eddy current sensors.

10. A steering mirror assembly as recited in claim 1 wherein the bandwidth of the actuators is at least about 10 kilohertz.

11. An assembly for steering a mass through a range of angular orientations, comprising:
    a) a deformable post, having an axis that extends along an entire length of the post, for holding the mass captively relative to the assembly and for limiting linear motion of the mass along the axis of the post;
    b) a steering means for adjusting an angular orientation of the mass relative to a null position; and
    c) a set of actuators for adjusting the angular orientation of the mass;
    d) a flexure ring for limiting rotational and linear motion of the mass and for reducing the coupling of secondary resonances in motion of the mass, comprising:
       an outer ring to provide coupling of the flexure ring to the assembly;
       an inner ring for coupling the flexure ring to the mass; and
       a set of arms of thin material that connect the inner ring to the outer ring.

12. An assembly as recited in claim 11, wherein the flexure ring is covered with a damping agent to dampen out high amplitude bending resonances in the arms of the flexure ring that might otherwise be present.

13. An assembly as recited in claim 11, wherein the actuators are voice-coil actuators.

14. An assembly as recited in claim 11, wherein the actuators operate with a bandwidth of at least 10 kilohertz.

15. An assembly as recited in claim 11, further comprising at least one sensor for sensing the current angular orientation of the mass.

16. An assembly as recited in claim 15, further comprising a feedback loop that uses position data obtained by the at least one sensor to adjust the position of the mass relative to an intended position of the mass.

17. A steering mirror assembly, comprising:
    a) a base;
    b) a mirror for reflecting signals to direct the signals to a destination;
    c) a deformable support post, having an axis that extends along an entire length of the post, positioned behind the mirror and coupled to the base to capitively hold and support the mirror, said post limiting linear motion of the mirror along the axis of the post;
    d) a set of voice-coil actuators positioned symmetrically behind the mirror on the base to adjust the angular orientation of the mirror, said actuators being able to adjust the mirror a maximum of approximately 1 to 2 degrees and operating with a bandwidth of approximately 10 kilohertz;
    e) a flexure ring for limiting rotational and linear motion of the mirror and for minimizing non-linearities in motion of the assembly, comprising:
       an outer ring to provide coupling of the flexure ring to the base;
       an inner ring for coupling the flexure ring to the mirror; and
       a set of arms of sheet material that connect the inner ring to the outer ring;
    wherein the flexure ring is coated with a damping agent to dampen out high amplitude bending resonances of the arms of the flexure ring;
    f) a set of position sensors positioned on the base for monitoring the angular orientation of the mirror; and
    g) a feedback means for utilizing data from the position sensors to adjust angular orientation of the mirror to correspond with a desired angular orientation.

* * * * *